United States Patent Office 2,721,223
Patented Oct. 18, 1955

2,721,223

HYDROGENOLYSIS OF SUBSTITUTED META DIOXANES

Erving Arundale and Louis A. Mikeska, Westfield, N. J., assignors to Esso Research and Engineering Company, a corporation of Delaware No Drawing. Application October 28, 1950, Serial No. 192,816

7 Claims. (Cl. 260—632)

This invention relates to a novel process for the preparation of saturated primary alcohols from hydrocarbon substituted meta dioxanes.

Olefins, unsaturated halides, and unsaturated ethers can be condensed with formaldehyde, acetaldehyde, benzaldehyde and the like in the presence of aqueous solutions of sulfuric acid of 20–65 percent concentration and at temperatures below 65° C. to form substituted meta dioxanes in as high as 85% yield. The following equation indicates the reaction which occurs when isobutylene is condensed with formaldehyde in the presence of a 20–25 weight percent sulfuric acid solution as the catalyst:

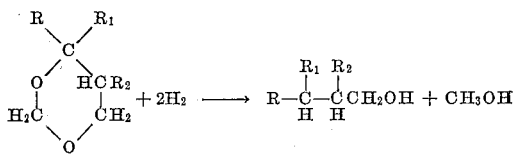

Tertiary butyl alcohol and 3 methyl 1,3 butanediol are byproducts in the above synthesis. These meta dioxanes have been found to be desirable solvents for resins and lacquers, antiknock agents for gasoline, and solvents for lubricating oil dewaxing operations. The method of preparation of individual hydrocarbon substituted meta dioxanes is disclosed in U. S. patents, Nos. 2,368,494; 2,362,307; 2,335,691; 2,504,732.

It has now been found that these hydrocarbon substituted meta dioxanes can be converted to saturated primary alcohols by treatment of the meta dioxanes in the liquid phase with hydrogen in the presence of a hydrogenation catalyst. The equation for the reaction of this invention is illustrated below, wherein 4,4-dimethyl meta dioxane is the dioxane employed and iso-amyl alcohol is the desired product

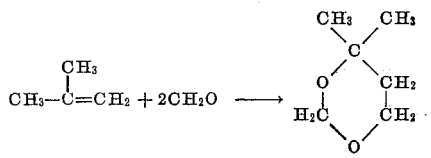

4,4 dimethyl meta dioxane          Isoamyl alcohol   methanol

The hydrocarbon substituted meta dioxanes utilized in the process of this invention, corresponds to the following general formula:

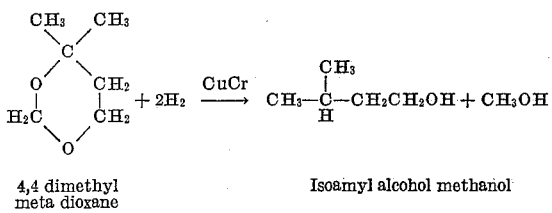

wherein R is an alkyl radical, and $R_1$ and $R_2$ are radicals selected from the group consisting of hydrogen and alkyl radicals. The $R_1$ and $R_2$ radicals can thus be the same or different. Those alkyl meta dioxanes wherein the alkyl groups contain no more than six carbon atoms are particularly adapted for the process of this invention.

The general formula for the reaction of this invention is thus illustrated below:

The quantities of reactants employed can follow the stoichiometric relations of the equation. In general, however, it is preferred to use the hydrogen in excess in order to drive the reaction to completion.

After completion of the reaction the excess hydrogen is removed by the reduction of pressure, the catalyst is removed by filtration, and the methanol component is taken off by straight distillation.

Listed below are typical hydrocarbon substituted meta dioxane feeds and the alcohol products obtained therefrom according to the process of this invention:

4 methyl meta dioxane→butanol 1
4,4 di methyl meta dioxane→3 methyl butanol 1
4,5 di methyl meta dioxane→2 methyl butanol 1
4 ethyl meta dioxane→pentanol 1
4 ethyl 5 methyl meta dioxane→2 methyl pentanol 1
4,4,5 tri methyl meta dioxane→2,3 di methyl butanol 1
4 propyl meta dioxane→hexanol 1

Since the reaction product of olefins with formaldehyde in the presence of acid catalysts is a mixture of an alkyl meta dioxane and the corresponding 1,3 butylene glycol, it is possible to subject the whole unpurified mixture (after acid catalyst removal) to hydrogenation to prepare primary alcohols.

The reaction is carried out with the dioxane principally in the liquid phase. The temperature employed in the reaction thus varies in the range of from 150 to 300° C. The pressure thus varies in the range of from 1,000 to 2,500 p. s. i. g.

A hydrogenation catalyst is utilized to facilitate the reaction of this invention. A particularly effective catalyst for this purpose is the copper-chromium oxide catalyst. The catalyst can be employed in amount between 2–15 weight percent based on the meta dioxane feed.

If desired the reaction can be carried out in an inert solvent (e. g., a hydrocaron such as cyclohexane or normal heptane) or ethyl, isopropyl or tertiary butyl alcohols. Water may also be added to the feed to improve conversion of the dioxane to alcohol.

This invention will be better understood by reference to the following examples of the preparation of the indicated compounds according to the process of this invention. Examples are also supplied for the preparation of individual hydrocarbon substituted meta dioxanes, and the copper-chromium oxide catalyst.

EXAMPLE I

Preparation of copper-chromium oxide catalyst 900 cc. of a solution (80° C.) containing 261 grams of hydrated copper nitrate ($Cu(NO_3)_2 \cdot 3H_2O$) and 31.3 grams of barium nitrate were added to 720 cc. of a solution (25–30° C.) containing 151.2 grams of ammonium dichromate and 225 cc. of 28 per cent ammonium hydroxide. The precipitate was filtered and the cake pressed as dry as possible. After drying in an oven at 80° C. for 17½ hours, it was pulverized and weighed 244 grams. It was then decomposed in an evaporating dish over a free flame. In carrying out the decomposition the powder was stirred with a spatula from the beginning of the heating and the flame was removed after the decomposition had started. There was a sudden evolution of gas and the mass became black. After a thorough stirring the powder was removed from the evaporating dish and allowed to cool. The product was then leached for one-half hour with 600 cc. of a 10 per cent acetic acid solution, filtered, and washed with 600 cc. of water in six 100 cc. portions. The catalyst was then dried overnight at about 130° C. before being pulverized. It weighed 159 grams.

EXAMPLE II

*Preparation of 4,4 di methyl meta dioxane*

1500 cc. (1705 grams) of 20 per cent sulfuric acid solution and 1920 grams of paraformaldehyde were placed in a three gallon lead lined turbomixer and 2430 grams of isobutylene added thereto. The batch was stirred and heated at 23–37° C. for approximately 1.5 hours during which time all of the formaldehyde reacted. The batch was then cooled and neutralized with 435 cc. of 45 per cent sodium hydroxide solution. The lower layer was withdrawn and the upper layer dried over anhydrous potassium carbonate, filtered, and fractionated. 2100 grams of 4,4 dimethyl meta dioxane were obtained boiling from 131–132.5° C. together with some tertiary butyl alcohol and 870 grams of higher boiling byproducts principally 3 methyl 1,3 butanediol.

EXAMPLE III

*Preparation of 4 ethyl 5 methyl meta dioxane*

650 cc. of 50 per cent sulfuric acid solution, 504 grams of paraformaldehyde and 840 grams of pentene 2 were stirred at 44–46° C. until all of the formaldehyde reacted (5 hours). The product (two layers) was cooled, neutralized with sodium hydroxide and steam distilled. The upper layer in the distillate was separated, dried over potassium carbonate, and fractionated. 400 grams of 4 ethyl 5 methyl meta dioxane were obtained boiling at 155–158° C.

EXAMPLE IV

*Preparation of 4,4,5 tri methyl meta dioxane*

4,4,5 tri methyl meta dioxane was prepared by the reaction of tri methyl ethylene with paraformaldehyde in the presence of a 25 per cent sulfuric acid solution as the catalyst at 25–35° C. The product boils at 152° C.

EXAMPLE V

*Preparation of isoamyl alcohol (3 methyl butanol 1)*

145 grams of 4,4 di methyl meta dioxane and 15 grams of a copper-chromium oxide catalyst were charged to a 300 cc. hydrogenation bomb. The bomb was purged with nitrogen and flushed with hydrogen. The bomb was then heated at 215–250° C. and the hydrogen pressure maintained at 2000 p. s. i. g. As hydrogen was consumed in the reaction (pressure dropped to 1200 p. s. i. g.) additional hydrogen was added to raise the pressure to 1900–2000 p. s. i. g. When no more hydrogen was consumed the bomb was cooled, excess hydrogen was removed, and the reactor contents filtered (to remove catalyst) and then fractionated at atmospheric pressure. A methanol cut (A) was taken between 63–67° C. and an isoamyl alcohol cut (B) at 130–133° C. These two products, which were obtained in molecular equivalent proportions, analyzed as follows:

| Compound | Found | | Theoretical | | |
| --- | --- | --- | --- | --- | --- |
| | Cut A | Cut B | 4,4 Di Methyl Meta Dioxane | Methanol | Isoamyl Alcohol |
| Boiling Point, ° C | 63–67 | 130–133 | 133 | 64.7 | 130–132 |
| Percent Carbon | 43.02 | 67.31 | 62.0 | 37.8 | 68.0 |
| Percent Hydrogen | 13.11 | 13.97 | 10.4 | 12.5 | 13.7 |
| Alcohol Purity, Percent | 83.5 | 97 | | 100 | 100 |
| Refractive Index | 1.3383 | 1.4070 | 1.4240 | 1.329 | 1.4078 |
| Reacts with Sodium | Yes | Yes | No | Yes | Yes |

EXAMPLE VI

*Preparation of 2 methyl pentanol 1*

145 grams of 4 ethyl 5 methyl meta dioxane and 15 grams of the copper-chromium oxide catalyst were placed in a 300 cc. hydrogenation bomb and heated to 250° C. Hydrogen was added, the pressure being maintained between 1300–1900 p. s. i. g. and the temperature 200–280° C. The products were isolated as described in Example V. Methanol (B. P. 63–70° C.) and 2 methyl pentanol 1 (B. P. 146–150° C.) were obtained together with some unreacted 4 ethyl 5 methyl meta dioxane.

EXAMPLE VII

*Preparation of 2,3 dimethyl butanol 1*

145 grams of 4,4,5 trimethyl meta dioxane and 15 grams of the copper-chromium oxide catalyst were treated at 200–250° C. with hydrogen at 1500–2050 p. s. i. g. The products were isolated as described in Example V. Methanol and 2,3 di methyl butanol 1 were recovered from the reaction product.

There are several distinct advantages inherent in the process of this invention. Among these is the fact that the reaction is straightforward and consequently the desired alcohol is easily and economically separated from the other reaction products. In addition, alcohols, e. g., isoamyl alcohol, which cannot be prepared by ordinary olefin hydration processes, can be prepared by the method of this invention. Other advantages will be apparent to those skilled in the art.

The alcohols prepared according to the process of this invention have many uses. Among these are their uses as organic solvents, plasticizers, lacquer solvents, intermediates for plasticizer manufacture, flotation agents, perfumery, antifoamants, chemical intermediate in the preparation of lube oil additives, synthetic lubricants and the like. The alcohols can also be dehydrated to form the corresponding olefins or they can be esterified with organic acids to produce useful ester solvents and plasticizers.

It is to be understood that the invention is not limited to the specific examples which have been offered merely as illustrations and that modifications may be made in equipment and conditions within the range specified without departing from the spirit of this invention.

What is claimed is:

1. A process for preparing methanol and a saturated primary aliphatic alcohol having 4 to 6 carbon atoms corresponding to the formula:

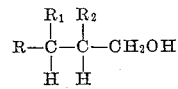

wherein R is a methyl radical, and $R_1$ and $R_2$ are each single substituents selected from the group consisting of hydrogen and methyl radical substituents, which comprises contacting methyl substituted meta dioxane corresponding to the formula:

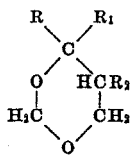

wherein R is a methyl radical and $R_1$ and $R_2$ are each single substituents selected from the group of hydrogen and methyl radical substituents, in the liquid phase with hydrogen at a pressure of 1000 to 2500 p. s. i. g. in the presence of copper-chromium oxide catalyst at a temperature of 150° to 300° C., and recovering methanol and the saturated primary aliphatic alcohol.

2. A process as in claim 1 in which the alcohol prepared is butanol-1 and the hydrocarbon substituted meta dioxane treated is 4 methyl meta dioxane.

3. A process as in claim 1 in which the alcohol being prepared is 3 methyl butanol 1, and the hydrocarbon substituted meta dioxane treated is 4,4 di methyl meta dioxane.

4. A process as in claim 1 in which the alcohol being prepared is 2 methyl butanol 1, and the hydrocarbon substituted meta dioxane treated is 4,5 di methyl meta dioxane.

5. A process as in claim 1 in which the alcohol being prepared is 2 methyl pentanol 1, and the hydrocarbon substituted meta dioxane treated is 4 ethyl 5 methyl meta dioxane.

6. A process as in claim 1 in which the alcohol being prepared is 2,3 di methyl butanol 1, and the hydrocarbon substituted meta dioxane treated is 4,4,5 tri methyl meta dioxane.

7. A process for preparing 3-methyl butanol-1 which comprises reacting gaseous hydrogen maintained under pressures in the range of 1200 to 2000 p. s. i. g. with 4,4 dimethyl meta dioxane in the presence of a copper-chromium oxide catalyst and at a temperature in the range of 215° to 250° C.

References Cited in the file of this patent

UNITED STATES PATENTS

| | | |
|---|---|---|
| 2,325,760 | Fitzky | Aug. 3, 1943 |
| 2,490,276 | Munday | Dec. 6, 1949 |
| 2,689,870 | Steadman | Sept. 21, 1954 |

OTHER REFERENCES

Conner et al.: J. Am. Chem. Soc., vol. 54, pp. 4678–90 (1932).

Vanduzee et al.: J. Am. Chem. Soc., vol. 57, pp. 147–51 (1935).

Gilman et al.: "Organic Chem., An Advanced Treatise," vol. I (1943), pp. 822–3, John Wiley & Sons, New York.

I. G. Farben, P. B. Report No. 81,383 (Fiat Final Report) No. 1000; Bib. Sci. Ind. Repts., vol. 7, 1134 (1947), p. 15 (1 page; December 26, 1947).

Baker et al.: Journal Amer. Soc., vol. 70, pp. 1490–1492 (1948).

Arundale et al.: Chemical Reviews, vol. 51, pp. 508, 509, 527, 528 (505–555) (December 1952).